United States Patent
Colin

(10) Patent No.: US 9,562,963 B2
(45) Date of Patent: Feb. 7, 2017

(54) SYSTEM FOR ACTIVATING THE DISTRESS BEACON OF AN AIRCRAFT

(71) Applicant: Airbus Operations (SAS), Toulouse (FR)

(72) Inventor: Michel Colin, Colomiers (FR)

(73) Assignee: Airbus Operations SAS, Toulouse (FR)

( * ) Notice: Subject to any disclaimer, the term of this patent is extended or adjusted under 35 U.S.C. 154(b) by 85 days.

(21) Appl. No.: 14/534,452

(22) Filed: Nov. 6, 2014

(65) Prior Publication Data

US 2015/0134154 A1 May 14, 2015

(30) Foreign Application Priority Data

Nov. 12, 2013 (FR) ..................... 13 61020

(51) Int. Cl.

| | |
|---|---|
| G01C 21/20 | (2006.01) |
| G01S 5/02 | (2010.01) |
| G01S 1/68 | (2006.01) |
| B64D 25/20 | (2006.01) |
| B64D 45/00 | (2006.01) |

(52) U.S. Cl.
CPC ............ *G01S 5/0231* (2013.01); *B64D 45/00* (2013.01); *G01C 21/20* (2013.01); *B64D 25/20* (2013.01); *B64D 2045/0065* (2013.01); *G01S 1/68* (2013.01)

(58) Field of Classification Search
USPC .......................................................... 701/14
See application file for complete search history.

(56) References Cited

U.S. PATENT DOCUMENTS

| | | | |
|---|---|---|---|
| 2005/0068164 A1* | 3/2005 | Hjalmarsson | G08B 25/009 340/506 |
| 2005/0216138 A1 | 9/2005 | Turung | |
| 2005/0237185 A1* | 10/2005 | Brown | G06F 21/81 340/539.21 |
| 2006/0167598 A1* | 7/2006 | Pennarola | G08G 5/0013 701/11 |
| 2008/0191861 A1* | 8/2008 | Mason | G08B 25/001 340/506 |
| 2009/0137921 A1* | 5/2009 | Kramer | A61B 5/1118 600/544 |
| 2009/0224966 A1* | 9/2009 | Boling | G01S 19/17 342/357.31 |

(Continued)

FOREIGN PATENT DOCUMENTS

| | | |
|---|---|---|
| JP | 2004212238 | 7/2004 |
| JP | 2004212238 A * | 7/2004 |

(Continued)

OTHER PUBLICATIONS

French Search Report, Jul. 1, 2014.

*Primary Examiner* — Shelly Chen

(74) *Attorney, Agent, or Firm* — Greer, Burns & Crain Ltd.

(57) ABSTRACT

A system for activating the distress beacon determines a positional difference between a theoretical position of the aircraft determined from data of the flight plan and a real position of the aircraft determined from the navigation and monitoring equipment installed in the aircraft. This system delivers an instruction to arm the distress beacon when one or more conditions are met, among which is the condition that the positional difference exceeds a predetermined value.

8 Claims, 3 Drawing Sheets

(56) References Cited

U.S. PATENT DOCUMENTS

| | | | |
|---|---|---|---|
| 2010/0207845 A1* | 8/2010 | Pal | G01C 23/005 345/7 |
| 2010/0245088 A1* | 9/2010 | Meier | G08B 13/08 340/545.1 |
| 2011/0122019 A1* | 5/2011 | Lee | G01S 5/0231 342/357.25 |
| 2011/0246002 A1* | 10/2011 | Shavit | G08G 5/0026 701/14 |
| 2012/0007750 A1* | 1/2012 | Gorabi | B63B 43/00 340/984 |
| 2012/0113575 A1 | 5/2012 | Uy et al. | |
| 2012/0215384 A1* | 8/2012 | Fritz | G05D 1/0061 701/2 |
| 2012/0280863 A1* | 11/2012 | Persson | G01S 5/0205 342/386 |
| 2014/0106333 A1* | 4/2014 | Dugan | B64D 47/02 434/428 |

FOREIGN PATENT DOCUMENTS

| | | |
|---|---|---|
| WO | 03023322 | 3/2003 |
| WO | 2004008415 | 1/2004 |
| WO | 2011010942 | 1/2011 |
| WO | 2011053805 | 5/2011 |

\* cited by examiner

SYSTEM FOR ACTIVATING THE DISTRESS BEACON OF AN AIRCRAFT

CROSS-REFERENCES TO RELATED APPLICATIONS

This application claims the benefit of the French patent application No. 1361020 filed on Nov. 12, 2013, the entire disclosures of which are incorporated herein by way of reference.

BACKGROUND OF THE INVENTION

The invention relates to the field of distress beacons installed in aircraft, these beacons also being known by the English acronym "ELT" (Emergency Locator Transmitter).

The invention relates more particularly to improving the reliability of activation of such a beacon, which is susceptible to being the source of false alarms.

The invention applies more particularly, but not exclusively, to the field of commercial aircraft.

Existing aircraft are equipped with a distress beacon which makes it possible to locate them in the event of an accident. Such a beacon comprises an acceleration sensor, also called a "G-switch." This sensor makes it possible, when the load factor measured by that sensor exceeds a predetermined threshold (in the event of a large deceleration of the aircraft or of an impact), to activate a transmitter of the beacon so that it transmits a 406 MHz radio signal that can be detected by geostationary satellites. When the transmitter is triggered, said beacon is said to be activated.

However, such an acceleration sensor requires complex and frequent calibration in order to avoid the untimely activation of the transmitter. For example, it is necessary to avoid a triggering of the transmitter in the case of a "hard" landing of the aircraft, which is of no consequence to the passengers and which is not therefore considered as an accident.

There is therefore a need to improve the reliability of activation of the distress beacon, while limiting the frequent and costly maintenance interventions such as the calibration operations mentioned above.

SUMMARY OF THE INVENTION

In order to respond to this need, an aspect of the invention relates to a system for activating the distress beacon of an aircraft, designed to determine a positional difference between a theoretical position of the aircraft determined from data of the flight plan and a real position of the aircraft determined from the navigation and monitoring equipment installed in the aircraft and also designed to deliver an instruction to arm the distress beacon when one or more conditions are met, among which is the condition that the positional difference exceeds a predetermined value.

Moreover, the invention departs from existing technology by carrying out an automatic arming of the beacon only when there is significant non-compliance with the flight plan. This way of proceeding contrasts with the systems of the prior art in which the beacon is armed during a large proportion of the flight, during which false alarms can be produced. The invention thus makes it possible to improve the reliability of activation of the beacon since the latter cannot be activated while it is not armed and the automatic arming takes place only in a situation of significant non-compliance with the flight plan encountered before a potential accident. Moreover, the invention does not require frequent and costly maintenance interventions such as the calibration operations found in the prior art.

The invention provides moreover one or more of the following optional features, taken independently or in combination.

The system is designed to deliver the instruction to arm the distress beacon when at least one of the following additional conditions is met:
- the real position of the aircraft is distant from (above) the surface of the water/of the land by a distance less than or equal to a predetermined value;
- the real position of the aircraft is farther than a predetermined distance from an airport zone;
- at least one cockpit warning, triggered at a fixed time t1 after the positional difference has exceeded the predetermined value, has not been deactivated within a specified period following the fixed time t1.

The activation system comprises a flight warning system capable of generating said cockpit warning.

Alternatively or simultaneously, the activation system comprises a touch screen capable of generating said cockpit warning.

The system is designed to deliver, after the arming of the distress beacon, an instruction to activate the beacon when the amplitude of a signal delivered by an acceleration sensor exceeds a predetermined threshold.

The system is also designed to deliver an instruction to arm the distress beacon when a surface proximity warning is detected, this warning condition possibly being cumulated with one or more other conditions.

The data of the flight plan for determining the theoretical position of the aircraft are delivered by the flight management system, also referred to as the FMS system.

The invention also relates to an aircraft comprising a distress beacon and a system for activating the beacon such as described above.

Finally, the invention relates to a method for activating a distress beacon of an aircraft, comprising the following steps:
- determination of a positional difference between a theoretical position of the aircraft determined from data of the flight plan and a real position of the aircraft determined from navigation and monitoring equipment installed in the aircraft; and
- delivering an instruction to arm the distress beacon when one or more conditions are met, among which is the condition that the positional difference exceeds a predetermined value.

Other advantages and features of the invention will become apparent in the following non-limiting detailed description.

BRIEF DESCRIPTION OF THE DRAWINGS

This description is given with reference to the appended drawings among which.

DETAILED DESCRIPTION OF THE PREFERRED EMBODIMENTS

Figure 1:
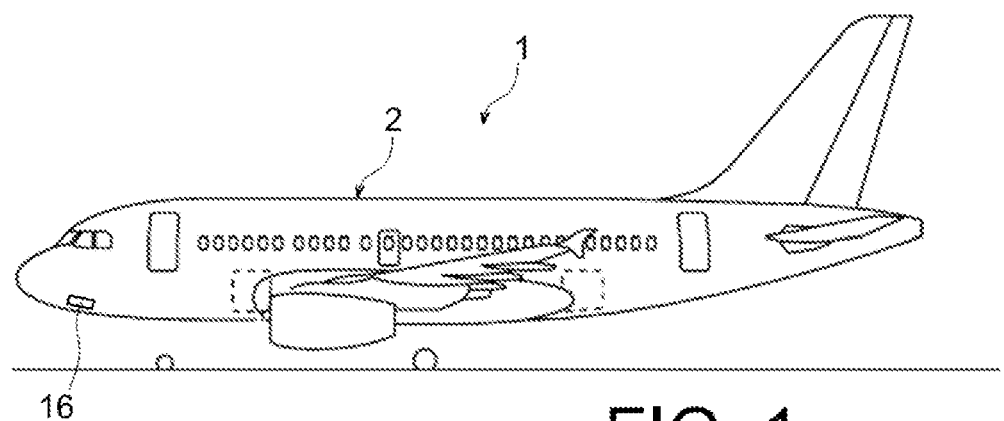
FIG. 1 shows a side view of an aircraft comprising a distress beacon intended to cooperate with an activation system according to the invention.

Referring to FIG. 1, an aircraft 1 is shown comprising at least one distress beacon 16 which is, for example, installed in the fuselage 2.

The ELT distress beacon 16 is of conventional design known to those skilled in the art. Generally, with reference to FIG. 2, the beacon 16 comprises a battery 4, a central processing unit 6 of the microcontroller type, a signal transmission device 8 and an acceleration sensor 10.

The battery 4 is connected to the transmission device 8 via the central processing unit 6. The acceleration sensor 10 is also connected to the central processing unit. The latter makes it possible to activate, when it receives instruction signals for this purpose, the supply of electrical current to the transmission device 8 by the battery 4.

The transmission device 8, when it is supplied with electrical current by the battery 4, transmits a 406 MHz radio signal which can be detected by geostationary satellites.

Figure 2:
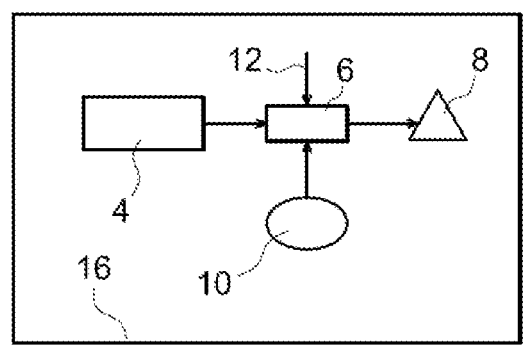
FIG. 2 shows a block diagram of the components of the distress beacon installed in the aircraft shown in the preceding figure.

Even though not shown in FIG. 2, the beacon 16 is also connected to different systems of the aircraft. Thus, the battery 4 is connected to the electrical power supply system of the aircraft via electronic components making it possible to provide its charging and discharging cycles. With regard to the central processing unit 6, this receives data signals coming from a control device installed in the cockpit of the aircraft, as represented diagrammatically by the arrow 12 in FIG. 2.

Figure 3:
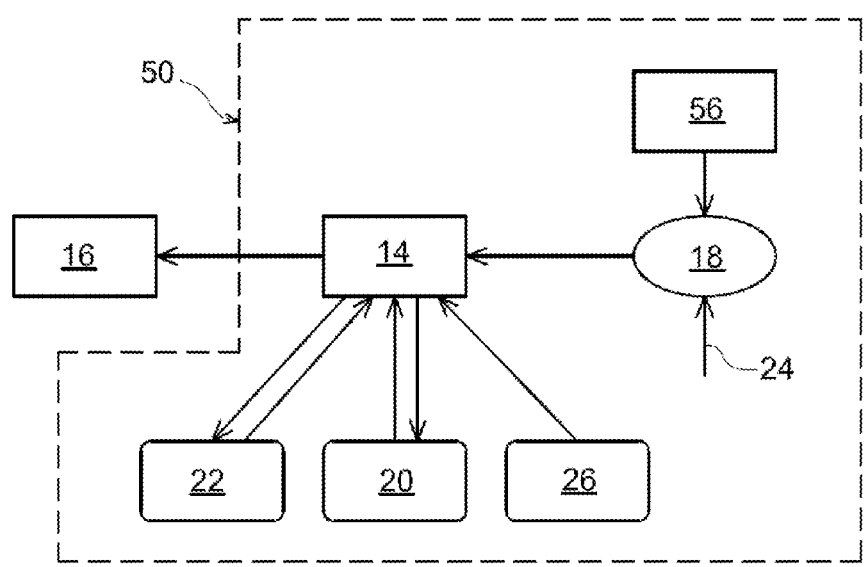
FIG. 3 shows a block diagram representing the cooperation between the distress beacon and its activation system.

Referring to FIG. 3, an example embodiment of an activation system 50 of the beacon 16 is shown. This system 50 comprises the abovementioned control device 14, which is connected to the fight management system 18, also commonly called the FMS (Flight Management System) system, of the aircraft.

In a first variant, the control device 14 is also connected to the flight warning system 20, called the FWS (Flight Warning System) system. In a second variant, compatible with the first one, the control system 14 is also connected to a touch screen 22 in the cockpit, for example the PFD (Primary Flight Display) screen, the display of which it can control and from which it can receive information when the pilot interacts with the screen. In this respect, it is noted that FIG. 3 shows an embodiment in which both of the variants are combined.

The FMS system 18 integrates the data of the flight plan which are loaded before the start of the flight, and possibly updated during the flight by the crew or at the request of the air traffic controller. Also, when such data are modified during the flight for meteorological, diversion or traffic problem reasons, the updated data of the FMS system 18 make it possible to provide automated flight control continuously. The loading of these data are represented diagrammatically by the arrow 24 in FIG. 3.

The FMS system 18 is also connected to navigation and monitoring equipment 56 installed in the aircraft. These equipment 56 conventionally comprise a geolocation system, etc. Thus the FMS system 18 is capable of detecting at any time a difference between the theoretical position of the aircraft determined from data of the flight plan and the real position of the aircraft determined from the equipment 56.

Finally, the control device 14 is connected to controls 26 of the touch screen, keyboard, conventional switches, etc. type, controls with which the pilots of the aircraft can act in order to manage the operating mode of the beacon 16, via the sending of instruction signals to the central processing unit of that beacon.

When operating, the central processing unit 6 of the beacon 16 can be switched, via the control device 14, into the following operating modes:

- the "OFF" operating mode, in which the beacon does not operate. In this mode, the battery 4 is not electrically connected to the transmission device 8.
- the "Armed" mode, in which the transmission device 8, or transmitter, is automatically activated (in the "ON" operating mode) if the acceleration sensor 10 of the beacon 16 detects that the aircraft is subjected to a load factor that is too large. In this operating mode, the battery 4 is not electrically connected to the transmission device 8, which remains deactivated;
- the "ON" operating mode, in which the transmission device 8 of the beacon 16 is activated after the latter has been triggered manually by a pilot or after it has been triggered automatically after being switched into the "Armed" mode. In this operating mode in which the beacon is said to be activated, the battery 4 is electrically connected to the transmission device 8 in order to supply it with power.

Figure 4:
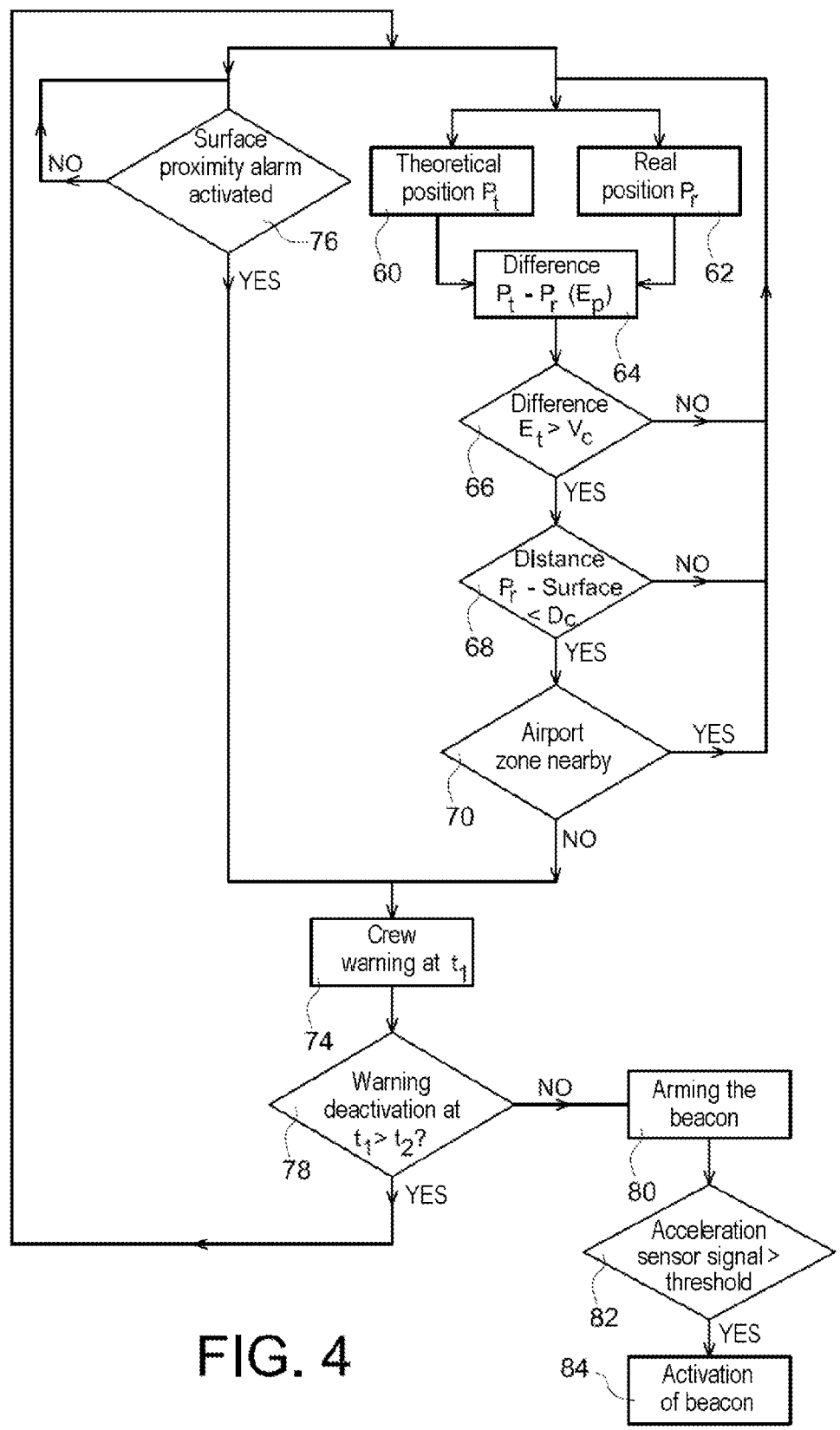
FIG. 4 is a flowchart of the operational logic of the system for activating the distress beacon.

One of the features of the invention is the fact that the switching into the "Armed" mode is operated by the control device 14 only when the latter detects abnormal flight conditions. Such operation will now be described with reference to FIG. 4.

During flight, the control device 14 of the beacon continuously carries out the determination 60, from data received from the FMS system 18, of the theoretical position Pt of the aircraft, from data supplied from the flight plan. It also continuously carries out the determination 62 the real position Pr of the aircraft, from data supplied by the navigation and monitoring equipment (56) installed in the aircraft.

The control device 14 also continuously carries out the determination 64 the difference Ep between the two positions Pt and Pr, and then the comparison 66 of this positional difference Dp with a predetermined value Vc. This predetermined value Vc is of the order of a few nautical miles.

If the positional difference Ep is greater than the predetermined value Vc, this indicates a flight path deviation likely to correspond with an accident. Moreover, the control device 14 implements several other tests, notably on the basis of data provided by the FMS system 18, before operating the triggering of the beacon 16.

For this purpose, the control device 14 firstly carries out a surface proximity test 68, the purpose of which is to determine if the altitude of the aircraft is distant from the surface of the water/of the land by a distance less than or equal to a predetermined distance Dc, which can for example be about 915 meters (corresponding to about 3000 feet). A negative result does not indicate accidental conditions and there is therefore a return to steps 60, 62. With an affirmative result, the control device 14 proceeds to an airport proximity test 70, the purpose of which is to determine if the real position Pr of the aircraft is distant from an airport zone, preferably by comparing the distance away from the closest airport with a reference distance. In the case where an airport is detected nearby, there is a return to the determination steps 60, 62. In the opposite case where no airport is detected in the proximity of the real position of the aircraft, all of the conditions are met for assuming that there is an accident.

The control device 14 then proceeds with the triggering 74 of a warning for the crew in the cockpit, via:

in the first variant, an alarm transmitted by the FWS system 20;

and in the second variant, a message displayed on the PFD touch screen 22.

Optionally, in parallel with the examination of the conditions 60 to 70, the control device 14 also proceeds with the monitoring 76 of a surface proximity alarm that can be delivered by the FWS system 20. If this alarm activates, this represents potential accident conditions and the triggering of the warning 74 is then triggered in the same way as when all of the conditions 60-70 are met.

After a fixed time t1 corresponding to the triggering 74 of the cockpit warning, and up to a later time t2 occurring for example 15 seconds after the time t1, the crew has the possibility, when it considers that it is a false warning, of proceeding with the deactivation of 78 of this warning.

In order to do this, in the case of the first variant where an alarm is triggered by the FWS system 20, the crew acts on a control 26 of the control device 14 in order to keep the beacon 16 in the "OFF" operating mode.

In the case of the second variant, where the alarm is displayed on the PDF touch screen 22, the crew interacts with this screen 22, again in such a way as to keep the beacon 16 in the "OFF" operating mode. This action can for example be carried out simply by touching the alarm window displayed on the screen 22, in such a way as to make it disappear.

When the two variants are combined, the crew must proceed with the abovementioned two actions in order that the deactivation may be effective.

In the case where the arming of the beacon 16 is inhibited during the period separating the times t1 and t2, steps 60, 62 and 76 are reiterated. In the opposite case, which represents accidental conditions, the control device 14 sends instruction signals to the central processing unit 6 of the beacon 16 so that the latter generates the switching into the "Armed" operating mode. This corresponds to the arming 80 of the beacon 16.

Once the beacon 16 has switched into this "Armed" operating mode, the acceleration sensor 10 continuously measures the load factor to which the aircraft in which the beacon 16 is installed is subjected. This measurement is carried out via the electrical power supply system of the aircraft and not by the battery 4 that remains inactive at this stage. The sensor 10 provides an electrical signal to the central processing unit 6, the amplitude of which is proportional to the measured load factor. The central processing unit 6 continuously carries out the comparison 82 of the amplitude of the signal from the sensor with a predetermined threshold.

As long as the amplitude remains below the predetermined threshold, no action is taken and the beacon 16 is kept in its "Armed" operating mode. On the other hand, if the threshold is exceeded, there is automatic activation 84 of the beacon 16, which then switches into the "ON" operating mode in which it is activated. This change of mode generates the triggering of the power supply of the transmission device 8 by the battery 4.

In general, the invention has the advantage of improving the reliability of activation of the beacon, since that latter cannot be activated as long as it is not armed, and this automatic arming takes place only in a particular situation of significant non-compliance with the flight plan, encountered before a potential accident. In other words, as long as the flight plan is complied with, the beacon is not armed and cannot therefore be activated.

Since the invention makes it possible to place the beacon is the "Armed" operating mode only in certain circumstances, or even never to engage this mode if the flight plan is complied with, the requirements in terms of energy and computing for making the acceleration sensor operate are advantageously reduced.

Moreover, it is noted that the touch screen for sending the cockpit warning, possibly in combination with the cockpit warning delivered by the FWS system, makes it possible to make this warning more visible to the pilots. This advantage responds to the problems encountered during stressful conditions which the pilots can undergo, situations during which the field of vision and hearing are particularly reduced.

Various modifications can of course be applied by those skilled in the art to the invention that has just been described solely by way of non-limiting examples.

As is apparent from the foregoing specification, the invention is susceptible of being embodied with various alterations and modifications which may differ particularly from those that have been described in the preceding specification and description. It should be understood that I wish to embody within the scope of the patent warranted hereon all such modifications as reasonably and properly come within the scope of my contribution to the art.

The invention claimed is:

1. A system for activating a distress beacon of an aircraft, the system being configured to determine a positional difference between a theoretical position of the aircraft determined from data of a flight plan and a real position of the aircraft determined from navigation and monitoring equipment installed in the aircraft and a control being configured to deliver an instruction to arm the distress beacon when one or more conditions are met, one of such conditions being that the determined positional difference exceeds a first predetermined value, wherein after the arming of the distress beacon, the control delivers another instruction to activate the distress beacon when an amplitude of a signal delivered by an acceleration sensor of the distress beacon exceeds a second predetermined value, and before the arming of the distress beacon, the control deactivates at least one cockpit warning based on a comparison between a first predetermined time period after the positional difference has exceeded the first predetermined value, and a second predetermined time period after the first predetermined time period when a false warning associated with the distress beacon is detected.

2. The system as claimed in claim 1, further configured to deliver the instruction to arm the distress beacon when at least one of the following additional conditions is met:

the real position of the aircraft is above a water or land surface by a distance less than or equal to a third predetermined value;

the real position of the aircraft is greater than a predetermined distance from an airport zone;

the at least one cockpit warning, triggered at a fixed time after the positional difference has exceeded the first predetermined value, has not been deactivated within a specified period following the fixed time.

3. The system as claimed in claim 2, comprising a flight warning system capable of generating said cockpit warning.

4. The system as claimed in claim 2, comprising a touch screen capable of generating said cockpit warning.

5. The system as claimed in claim 1, further configured to deliver an instruction to arm the distress beacon when a surface proximity warning is detected.

6. The system as claimed in claim 1, wherein the data of the flight plan for determining the theoretical position of the aircraft are delivered by the flight management system.

7. An aircraft comprising a distress beacon and a system for activating the distress beacon,
the system being configured to determine a positional difference between a theoretical position of the aircraft determined from data of a flight plan and a real position of the aircraft determined from navigation and monitoring equipment installed in the aircraft and
a control being configured to deliver an instruction to arm the distress beacon when one or more conditions are met, one of such conditions being that the determined positional difference exceeds a first predetermined value,
wherein after the arming of the distress beacon, the control delivers another instruction to activate the distress beacon when an amplitude of a signal delivered by an acceleration sensor of the distress beacon exceeds a second predetermined value, and
before the arming of the distress beacon, the control deactivates at least one cockpit warning based on a comparison between a first predetermined time period after the positional difference has exceeded the first predetermined value, and a second predetermined time period after the first predetermined time period when a false warning associated with the distress beacon is detected.

8. A method for activating a distress beacon of an aircraft, comprising the following steps:
determining a positional difference between a theoretical position of the aircraft determined from data of a flight plan and a real position of the aircraft determined from navigation and monitoring equipment installed in the aircraft;
delivering an instruction to arm the distress beacon when one or more conditions are met, one of the conditions being the positional difference exceeds a first predetermined value;
after the arming of the distress beacon, delivering another instruction to activate the distress beacon when an amplitude of a signal delivered by an acceleration sensor of the distress beacon exceeds a second predetermined value; and
before the arming of the distress beacon, deactivating at least one cockpit warning based on a comparison between a first predetermined time period after the positional difference has exceeded the first predetermined value, and a second predetermined time period after the first predetermined time period when a false warning associated with the distress beacon is detected.

* * * * *